Figure 1:
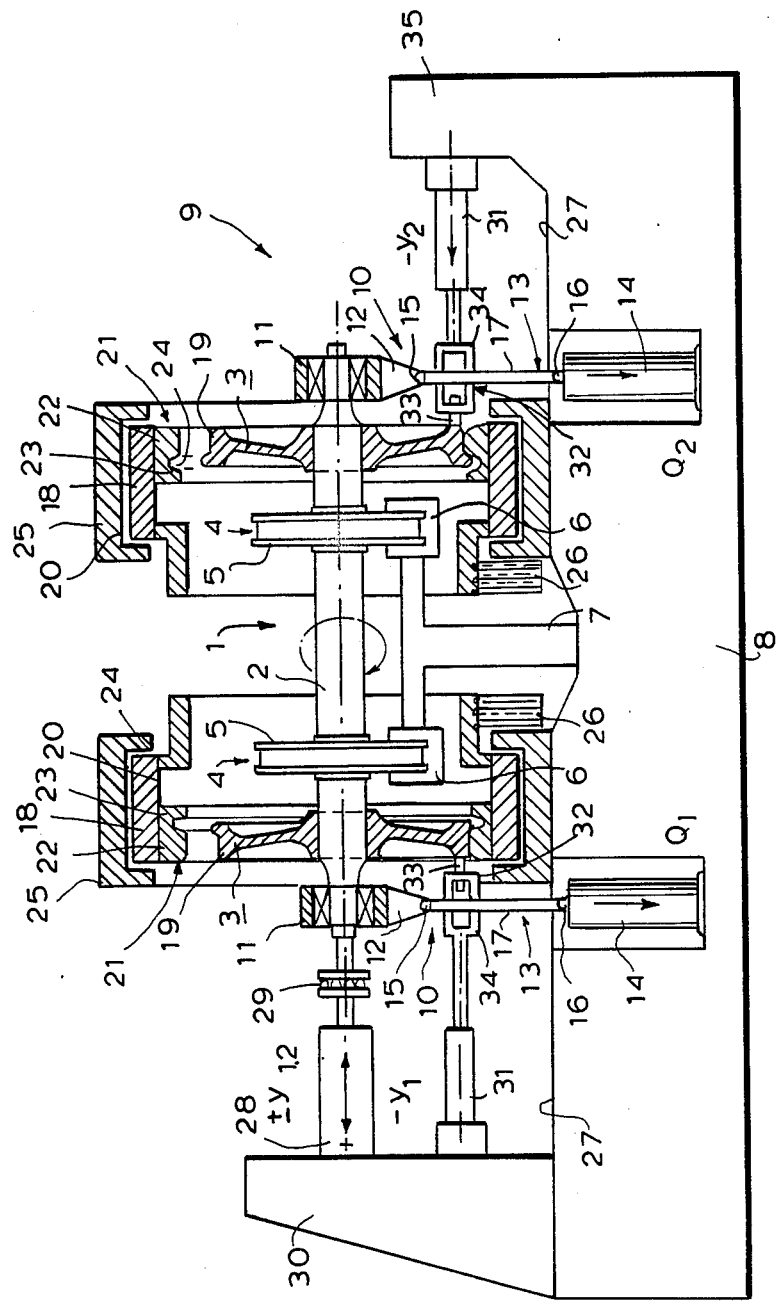

United States Patent [19]

Fischer et al.

[11] Patent Number: 4,800,748
[45] Date of Patent: Jan. 31, 1989

[54] METHOD AND APPARATUS FOR TESTING RAIL VEHICLE WHEELS

[75] Inventors: Gerhard Fischer, Menzelweg; Vatroslav Grubisic, Zum Stetteritz, both of Fed. Rep. of Germany

[73] Assignee: Fraunhofer-Gesellschaft zur Förderung der angewandten Forschung e.V., Munich, Fed. Rep. of Germany

[21] Appl. No.: 11,637

[22] Filed: Feb. 6, 1987

[30] Foreign Application Priority Data

Feb. 10, 1986 [DE] Fed. Rep. of Germany ....... 3604186

[51] Int. Cl.$^4$ ............................................. G01M 7/00
[52] U.S. Cl. .................................... 73/865.9; 73/146
[58] Field of Search .................... 73/118.1, 117, 117.1, 73/117.2, 117.3, 123, 125, 126, 865.6, 865.9, 146, 8

[56] References Cited

U.S. PATENT DOCUMENTS

| | | | |
|---|---|---|---|
| 3,823,485 | 7/1974 | Lambrecht | 73/117 |
| 4,160,378 | 7/1979 | Himmler | 73/146 |
| 4,475,383 | 10/1984 | Fischer | 73/8 |
| 4,501,139 | 2/1985 | Petersen | 73/118.1 |
| 4,520,444 | 5/1985 | Koos | 73/117 |

FOREIGN PATENT DOCUMENTS

| | | | |
|---|---|---|---|
| 2601259 | 7/1977 | Fed. Rep. of Germany | 73/146 |
| 3040355 | 5/1982 | Fed. Rep. of Germany | 73/117 |
| 2318411 | 2/1977 | France | 73/117 |
| 726464 | 4/1980 | U.S.S.R. | 73/117 |
| 991228 | 1/1983 | U.S.S.R. | 73/117 |
| 1006958 | 3/1983 | U.S.S.R. | 73/117 |
| 1016726 | 5/1983 | U.S.S.R. | 73/117 |
| 198995 | 11/1923 | United Kingdom | 73/117 |

Primary Examiner—Stewart J. Levy
Assistant Examiner—Robert R. Raevis
Attorney, Agent, or Firm—Bauer & Schaffer

[57] ABSTRACT

The invention provides a method and an apparatus for testing wheel-sets of rail vehicles under loading conditions resembling those occurring in service, in which radial and/or axial forces are introduced into the wheel via the contact point of the wheel and the rings which represent the rail simulating all operational loading conditions. In a particular embodiment of the method and the apparatus according to the invention, it is also possible to introduce additional axial forces into the wheel contact point of one or both vehicle wheels through the rim and the rings which represent the rail on which the wheel runs during the test in addition to the axial forces introduced through the axle. It is possible by this arrangement to test a whole wheel-set of a rail vehicle and so to determined its reliability possible critical areas under operational loading conditions.

17 Claims, 5 Drawing Sheets

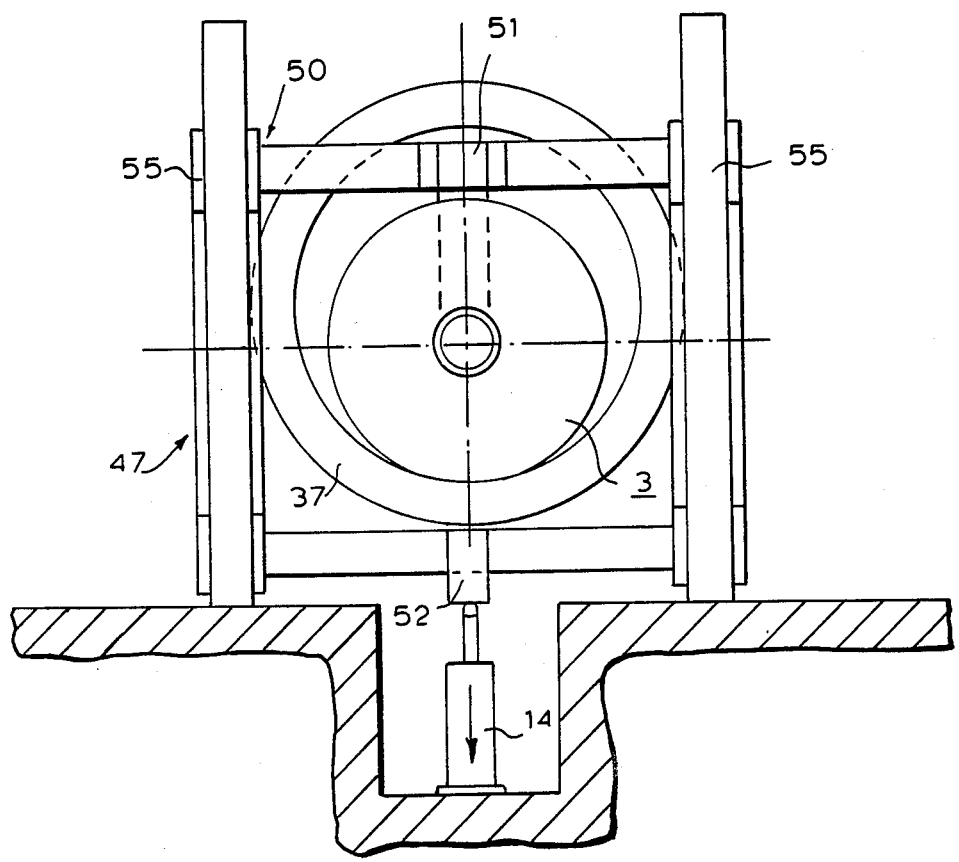

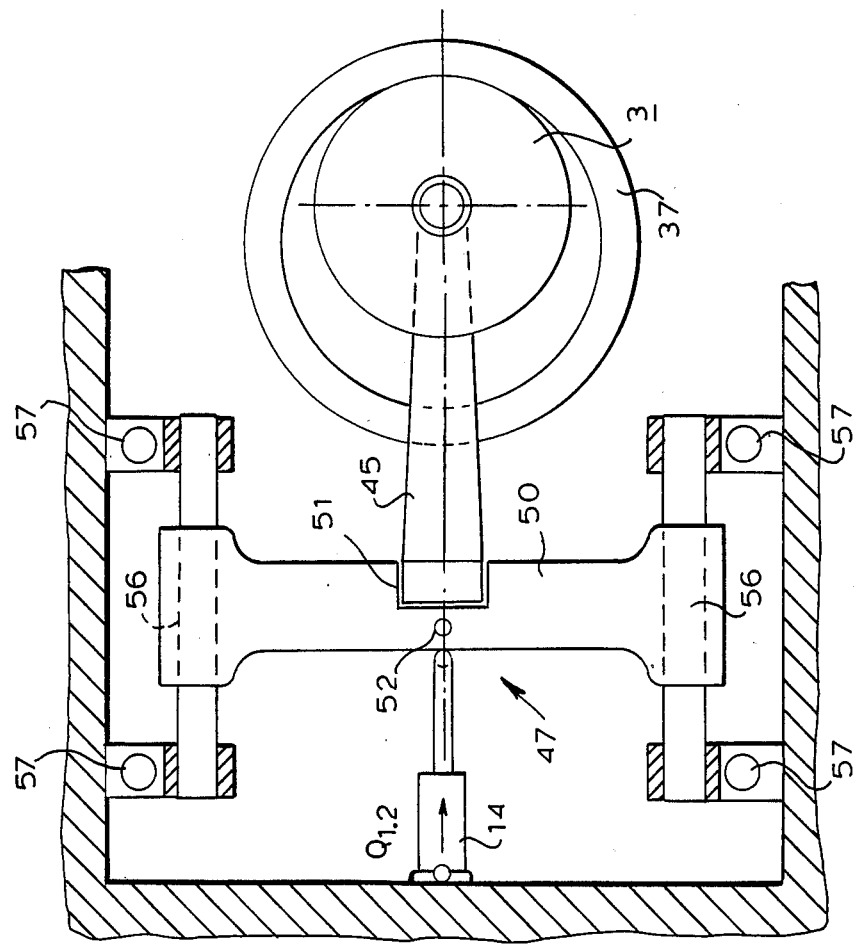
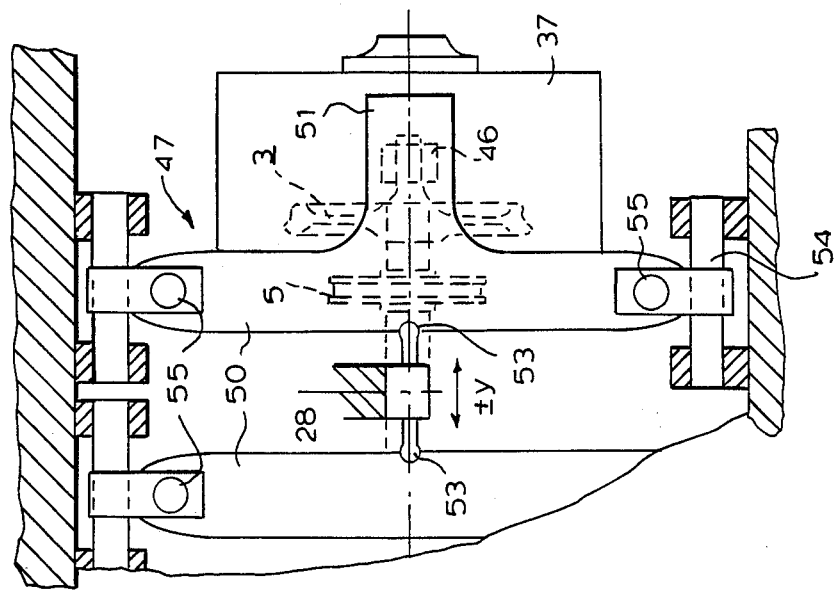

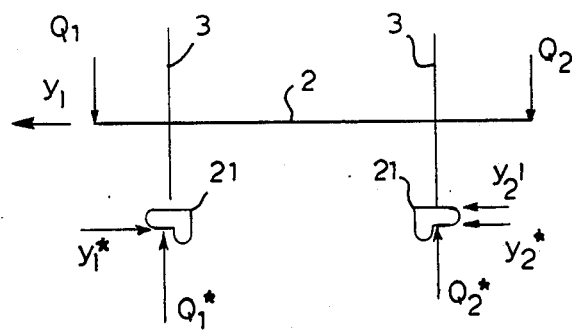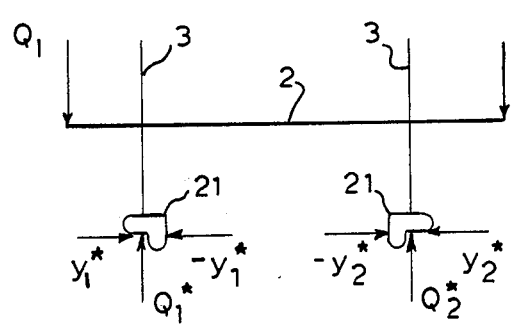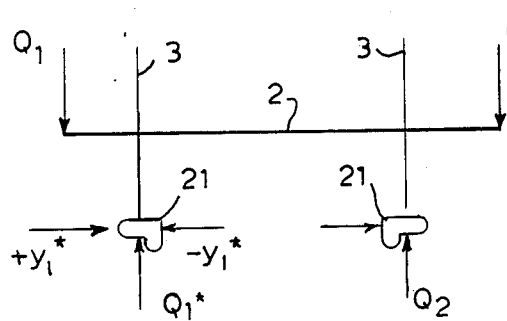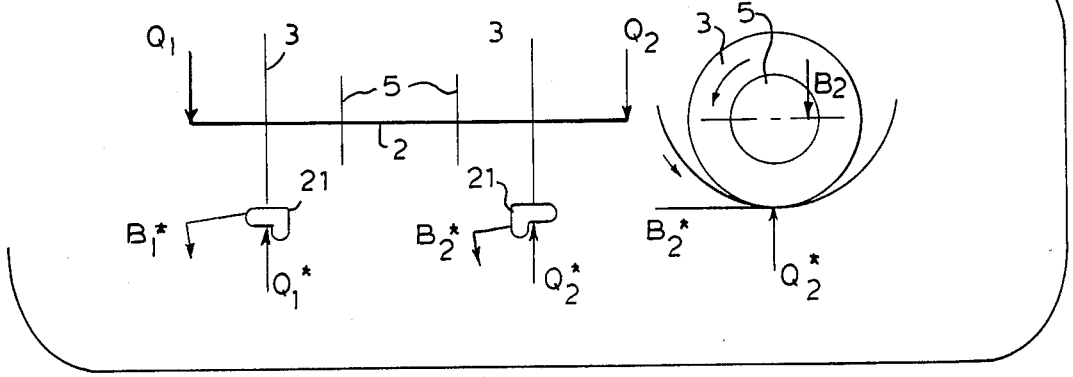

METHOD AND APPARATUS FOR TESTING RAIL VEHICLE WHEELS

This invention relates to a method for testing the service of rail vehicle wheels and wheel sets that consist of at least one wheel axle and at least the wheels mounted upon said axle radial and axial forces are introduced at the point of wheel to ground contact, the radial forces being introduced selectively upon the axle of one of the two vehicle wheels or upon both wheels.

The invention also relates to an apparatus for testing the wheels of rail vehicles in which a whole wheel set for rail vehicles is tested by the introduction of radial and axial forces into the point of wheel to ground contact the radial forces being introduced selectively upon the axle of one of the two vehicle wheels or of both wheels, comprising (a) a support for rotatably holding the rail vehicle wheel set;
(b) a first radial loading device connected to the wheel axle region of one wheel and a second radial loading device connected to the wheel axle region of the other wheel and
(c) an axial loading device for applying an axial force.

According to the state of the art, the wheels of rail vehicles may be tested on conventional rotating bending test rigs whereby the wheel is firmly clamped at its circumference and an unbalanced mass connected to the axle of this wheel produces a rotating bending moment. One of the main disadvantages of above rotating bending test rig is the fact that only bending moments due to axial forces are simulated while the stresses produced by radial loading are not simulated. Furthermore, since the wheels are firmly clamped at their circumference, a free deformation is prevented, thus stresses produced in the wheel disc do not reflect those which occur under service conditions. Moreover, wheels are only tested in combination with experimental axle so that the test does not cover the complete wheel set of a rail vehicle.

Although resonant test rigs are in existence in which a whole wheel set of a rail vehicle can be tested, the wheels are not rotated in these test rigs so that only a cross-section of the wheel set is tested and the test therefore does not take place under the loading conditions which occur in practice.

A process and an apparatus for testing the wheels of rail vehicles under loading conditions similar to those occurring in service have been disclosed in German patent specification No. 2 601 259. In this apparatus, the radial and axial forces normally occurring in rail transport are produced by means of servohydraulic loading cylinders which act on the wheel in such a manner that the force is introduced at the point of contact of the wheel with the ground. However, this arrangement can only be used to test the half axle of the corresponding vehicle wheel so that only the vehicle wheel can be an original wheel and it is not possible to use the original axle in this apparatus. Instead, the half axle consists of a specially manufactured experimental axle and it is not possible to simulate the variations in the bending moment which occur in the original wheel set of the vehicle, nor is it possible to test a complete wheel set of a rail vehicle under loading conditions which simulate service. Moreover, in the apparatus according to German patent specification No. 2 601 259, the axial load is applied to the vehicle wheel by tilting the drum, so that axial loading always occurs in combination with a radial loading component. The necessity to tilt the drum makes for a complicated construction of the whole apparatus which limits the test speed to less than 100 km/h.

U.S. Pat. No. 4,475,383 in the name of the present Applicant discloses an apparatus for testing vehicle wheels, as well as wheel hubs, wheel bearings and wheel bolts under loading conditions which are similar to those occurring in service. In this new apparatus, the wheel forces are applied through a rotating drum and contact rings in the drum, and the vehicle wheel is placed obliquely to simulate the axial and radial forces acting on the point of contact of the wheel as it rolls over the road in a bend. An apparatus, of this type is originally designed for testing the wheels of road vehicles, in other words wheels with elastically deformable tires and has the advantage that the axial force is produced by the support structure which holds the vehicle wheel so that it is not necessary to tilt the drum. This apparatus, however, U.S. Pat. No. 4,475,383, is not suitable for testing the wheels of rail vehicles nor is it possible to test whole wheel sets. In fact, the above described apparatus can only be used for testing single wheels with experimental half axles, and it is also unsuitable to simulate the distribution of bending moments on a wheel set.

German Offenlegungsschrift No. 2 551 067 discloses an apparatus for testing tires which comprises the following features: A frame to be fitted to a motor vehicle, a holder for a measuring device to be fixed in position substantially parallel to the transverse axis of the vehicle to which the apparatus is to be attached during use, the said holder being pivotally attached to the frame at one end so that the holder can rock in a horizontal and a vertical plane, a device by which the tire to be tested can be fixed to that end of the holder for the measuring device which is remote from its pivotal point of attachment, an arrangement for exerting a load on the holder for the measuring device so that a load is applied to the tire to be tested, and at least one force converter for measuring the force exerted on the holder by the tire during the test. This apparatus is not suitable for testing wheel sets of rail vehicles but only for testing rubber tires directly mounted on a motor car to determine the different effects produced under different camber angles and slip angles.

An apparatus for testing the rubber tires of motor vehicles is disclosed in U.S. Pat. No. 4,479,381 which provides a means for optically determining dynamic non-uniformities. This apparatus is as unsuitable as the apparatus disclosed in the above-mentioned German Offenlegungsschrift No. 2 551 067 for testing wheel sets of rail vehicles.

A procedure and an apparatus of the type defined above has also been disclosed in DDR Pat. No. 73 893. The procedure is used for measuring the wheel forces in the wheels of rail vehicles and the apparatus is used for calibrating sets of measuring wheels. The procedure, however, does not include the possibility of testing under service-like loading conditions. Although the wheel set is supported, it is only supported in such a manner that static measurements can be carried out on it, i.e. measurements on a stationary wheel. Although lateral forces and vertical forces can be introduced into the wheel set with this apparatus, the dynamic loading conditions which occur in a revolving wheel set as it rolls over rails cannot be simulated in this apparatus.

It is the object of the present invention to provide a method and an apparatus for testing of wheels and wheel-sets of rail vehicles which simulate the loading conditions in service.

This task is solved according to the invention by a process of the type described above. In the process according to the invention, the wheel set is rotated by bringing the wheels into rolling engagement with rotating rings which represent endless rail and the axial forces are selectively introduced upon the wheel axle or both of the two vehicle wheels, so that the wheel set is tested under loading conditions similar to those occurring in service.

The apparatus according to the invention constructed as described above for testing wheels of rail vehicles is distinguished according to the invention in that (d) a drum is placed round each vehicle wheel in such a manner that the rim of the wheel can be brought into rolling contact with a rail positioned on the internal circumferential surface of the drum, (e) a driving device is provided for rotating the drum, and (f) the axial loading device is connected to the axle of the wheel set of the rail vehicle either directly or by way of a loading support in which the wheel set of the vehicle is held.

By means of this method and apparatus according to the invention, the loading conditions which occur in wheel sets of rail vehicles under service conditions can be simulated; in particular, it is possible to simulate the loading conditions not only in a single wheel but also in a complete wheel set. In particular, this method and this apparatus can be used to simulate the loading conditions which occur when a rail vehicle is driven in a straight line and/or is braking and the method and apparatus can also be used to simulate the loading conditions which occur in service when a rail vehicle drives straight over points.

As a further development of the method according to the invention enables to simulate, the other loading conditions which occur in service when the vehicle travels round a bend or in a curve can over the points. This further development of the method is characterized in that in addition to the axial forces introduced by way of the wheel axle of the rail vehicle, additional axial forces are introduced into the contact point of the wheel to the rail of one or both wheels upon the wheel rim or the ring on which the wheel run during the test and which ring represents the rail.

A further development of the apparatus according to the invention enables the above described further development of the method is characterized in that at least one additional axial loading device is provided for introducing an additional axial force into the wheel contact point of at least one of the vehicle wheels, this additional loading device being coupled to the wheel rim or to the ring which represents the rail of at least one of the wheels to produce the additional axial force.

In such an apparatus, each of the two wheels of the vehicle preferably has its own separate additional axial loading device.

The above described further development of the method according to the invention may, in particular, be so arranged that in order to test the wheel set of the vehicle under conditions of travelling in a curve or round the bend, an axial force is introduced into the wheel contact point of one wheel through the wheel axle region of the latter and at the same time an additional axial force is introduced into the wheel contact point of the other wheel through the wheel rim or through the ring representing the rail on which the other vehicle wheel runs.

The aforesaid further development of the process according to the invention may also be so arranged that in order to test the wheel set of the vehicle under certain conditions of travelling over points, an axial force is introduced into the wheel contact point of one wheel through the wheel axle region of said wheel while no additional axial force is introduced into this contact point through the rail or the wheel rim and, alternating with this arrangement, no axial force is introduced into the wheel contact point of this wheel through the wheel axle region while an additional axial force is introduced into this contact point through the ring which represents the rail or the wheel rim. By this arrangement, the loading conditions occurring when a vehicle is travelling over points can also be simulated for those cases in which very high axial forces directed to the exterior of the vehicle, also known as negative axial forces occur.

Lastly, the process may be so arranged, as already indicated, that the brake on the wheel set of the rail vehicle is also tested by introducing braking forces into the point of contact of the wheel with the ground.

The apparatus according to the invention may be designed to provide a separate drum for each of the two wheels of the rail vehicle.

A relatively simple and compact construction of the apparatus according to the invention may be obtained by mounting the common drum for the two wheels or the separate drum for each of the two wheels on a bearing placed round the circumference of the drum, preferably a hydrostatic or electromagnetic bearing so that the drum is substantially open in the axial direction.

Another embodiment of the apparatus according to the invention, which is somewhat more complicated and takes up more space than the embodiment mentioned above but requires no hydrostatic or electromagnetic or any other circumferential bearing for the drum is characterised in that the common drum for the two vehicle wheels, which is open in one axial direction, or the separate drum provided for each of the two wheels is mounted on the axial shaft of its rotary drive and if separate drums are provided these are arranged coaxially and axially open on the sides facing one another. This embodiment of the apparatus according to the invention may be so constructed that the common drum or the separate drums are displaceable in the axial direction for the introduction of additional axial forces through the drums and for mounting the wheel set in the apparatus and removing it from the apparatus.

If the drums are mounted on the axial shaft of the rotary drive, the axial and radial forces can easily be applied to the wheel contact points of the two wheels of the set, and in the case of two separate drums, each wheel of the vehicle is supported by a separate loading support at the corresponding end of the vehicle axle, this support being connected to a force transmitting device which is moveable perpendicularly and parallel to the vehicle axle and is in turn coupled to the axial and radial loading device, for example a servo hydraulic cylinder.

If the drums are mounted on circumferential drum bearings, the additional axial loading device may be directly coupled to the rim of the respective wheel, preferably by means of one or more rollers, since the wheels are readily accessible when they are in position in the apparatus according to the invention.

If, on the other hand, the drums are mounted on the axial driving shaft, it is advisable to construct the apparatus according to the invention in such a manner that the additional axial loading device is coupled to the ring which represents the rail by way of the drum as there is only restricted access to the two wheels from outside when they are fitted into the apparatus.

The embodiment of the apparatus according to the invention in which the drums are mounted on circumferential bearings has the further advantage that the axial loading device can be directly coupled to the axle of the vehicle, preferably by a tension-compression thrust bearing. In addition, in this embodiment the radial forces can be applied to the wheel contact point through the original bearings of the rail vehicle and the original bearings can be used as supports for the wheel set in the apparatus according to the invention.

Lastly, another preferred embodiment of the apparatus according to the invention is characterized in that the rings which represent rails used for introducing negative axial forces are grooved rings.

Figure 2:
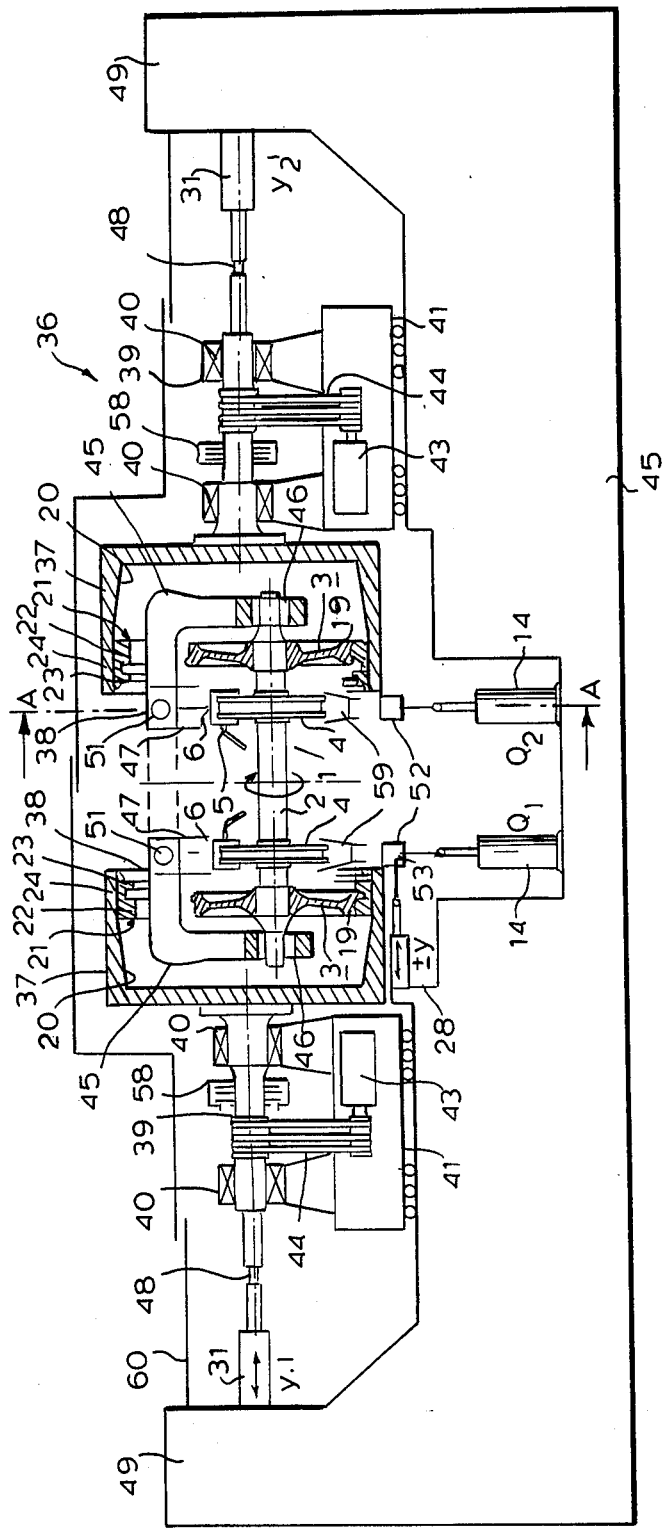

Preferred embodiments of the invention are described below with reference to particularly preferred embodiments of the apparatus and the process of the invention illustrated in FIGS. 1 to 9, in which FIG. 1 is a side view of a first embodiment of an apparatus according to the invention in which the parts, in particular the vehicle wheels to be tested, the ring which represents the rails over which the wheels roll, the drums on the internal circumference of which the rings are mounted, and the drum bearings as also the bearings in which the wheel set rotates are shown in section, FIG. 2 is a side view of a second embodiment of an apparatus according to the invention in which some parts are shown in section, in particular the parts mentioned with reference to FIG. 1, FIG. 3 is a section taken on the line A—A of FIG. 2 viewed in the direction of the arrow, showing the load transmission device illustrated on the righthand side of FIG. 2, by means of which the radial and axial loads are transmitted from the radial and axial loading device to the support on which the right wheel of the rail vehicle shown in FIG. 2 is rotatably mounted; FIG. 3 also shows the radial loading device coupled to the load transmission device, FIG. 4 is a top plan view of the load transmission device of FIG. 3, showing the axial loading device coupled to the load transmission device, FIG. 5 is a side view corresponding to FIG. 3 of a load transmission device by which the radial forces from the radial loading device shown in FIG. 5 are transmitted in a horizontal direction to the support for the vehicle wheel instead of in the vertical direction as in FIG. 3, FIG. 6 is a schematic representation of the forces applied and occurring in an apparatus according to the invention under conditions simulating the movement of a vehicle in a curve or round a bend, FIG. 7 is a schematic representation of the forces applied or occurring in an apparatus according to the invention under conditions simulating a sinusoidal movement, i.e. movement in a straight line, FIG. 8 is a schematic representation of the forces applied and occurring in an apparatus according to the invention under conditions simulating movement over points, and FIG. 9 is a schematic representation of the forces applied and occurring when a braking action is applied to the rotation of the wheel set under investigation, the lefthand part of FIG. 9 representing the front view of the wheel set and the rails as in FIGS. 6, 7 and 8 while the righthand part of FIG. 9 represents a side view of the wheel set.

A first embodiment of an apparatus illustrated in FIG. 1 for testing wheel sets of rail vehicles under conditions of loading similar to those occurring in will be described first.

A wheel set (1) for a rail vehicle is supported in this apparatus for the purpose of being tested. The wheel set comprises an axle (2) and at least one rail vehicle wheel (3) mounted at each end. The wheel set (1) shown in the figure also has a brake (4) which is preferably the original brake of the wheel set (1) of the original rail vehicle. This brake may consist, for example, as illustrated in the drawing, of two disc brakes comprising brake discs (5) which are fixed to the wheel axle (2) and brake jaws (6) which are fixed by some suitable device (7) to the base (8) of the apparatus (9) for testing the wheel set of the rail vehicle.

The apparatus (9) has a support (10) for rotatably supporting the wheel set (1) of the vehicle. In the embodiment of the apparatus (9) shown in FIG. 1, in which the wheel set (1) is readily accessible from outside even when it is supported in the apparatus (9), the support (10) preferably comprises the original wheel set bearings (11) and a fastening device (12) attached to each wheel set bearing (11) and connected by a connecting device (13) to a radial loading device (14) which in turn is mounted on the base (8). The connecting device (13) may consist, for example, of a first joint (15) provided on the fastening device (12) and/or a second joint (16) provided on the radial loading device (14) and a supporting and force transmitting rod (17). This supporting and force transmitting rod connects the fastening device (12) to the radial loading device (14) through the first joint (15) and/or the second joint (16). As shown in FIG. 1, a support (10) is provided at each axial end of the wheel set (1) of the vehicle.

The apparatus (9) further comprises a drum (18) for each of the two vehicle wheels (3). Each drum (18) is placed around its wheel (3) so that the rim (19) of the wheel (3) can be brought into contact with the ring (21) which represents the rail located on the internal circumferential surface (20) of the drum. The drums (18) are also referred to as loading drums on account of the function which they perform in the apparatus (9).

The ring (21) may be described in general terms as a track profile for the rim (19) of the wheel (3). In the embodiment shown here, it comprises not only the track body (22) over which the rim (19) of the wheel rolls but also a spacer (23) enabling forces of reaction acting in both axial directions to be produced in the contact point of the wheel. The spacer (23) which, viewed in the axial direction, is situated further to the centre of the wheel set than the track body (22), may either be constructed as a separate part and mounted at a predetermined distance from the track body (22) or it may be constructed in one piece with the track body (22), as shown in FIG. 1, but separated from the track body (22) by a groove (24) in the part facing the rim (19), which case the ring (21) forms a so-called grooved ring.

In the embodiment of FIG. 1, each of the two drums (18) provided one for each of the two vehicle wheels (3) is mounted in a drum bearing (25) which is placed around the circumference of the drum (18) and may therefore also be described as a circumferential drum bearing. The drum bearing (25) is preferably a hydrostatic or electromagnetic bearing. The use of such a bearing for the drums (18) has the advantage that the drums (18) may be open in each axial direction, as shown in FIG. 1, so that the wheel set (1) installed for the test is readily accessible from outside during the test and the whole apparatus (9) is simple and compact in construction.

The two drums (18), which could be replaced by a single drum although this is not preferred, are rotated by a drive device (not shown). This drive device may consist, for example, of an electric motor common to the two drums and coupled to the drums (18) by drive belts (26).

The following loading devices are provided for introducing the loads into the wheel contact point of each of the two wheels (3) as required for testing the wheel set (1):

(1) The two radial loading devices (14) already mentioned, each of which acts on one of the two free ends of the vehicle axle (2) through one of the two wheel set bearings (11) and the corresponding supporting and force transmitting device (10). These radial loading devices (14) are preferably servohydraulic cylinder and the forces which they introduce into the wheel contact point of individual wheel (3) are radial forces $Q_1$ and $Q_2$ which will be described below and which induce the forces of reaction $Q_1^*$ and $Q_2^*$. The radial loading devices (14) may advantageously be mounted into the bottom of the base (8) of the apparatus (9) opposite the mounting surface (27) which forms a platform for most of the other parts of the apparatus.

(2) An axial loading device (28) for the introduction of axial forces $\pm Y_1$ (left vehicle wheel) and $\pm Y_2$ (right vehicle wheel) as forces of action into the wheel contact point of the corresponding wheel (3), which induce the axial forces of reaction $\pm Y_1^*$ and $\pm Y_2^*$. In the example given here, the axial loading device (28), which again is preferably a servo hydraulic cylinder, is coupled to the end of the vehicle axle (2) which is on the left in FIG. 1 through a compression tension thrust bearing (29) so that the axial forces $\pm Y_{1,2}$ are introduced into the wheel contact points through the axle of the vehicle. The axial loading device (28) is attached to a vertical support structure (30) of the base (8).

(3) Additional axial loading devices (31) are provided for the introduction of additional axial forces $Y_1'$ (left vehicle wheel) and $Y_2'$ (right vehicle wheel) which forces out at the wheel contact point of the corresponding wheel (3). This additional axial force $Y_1'$ and $Y_2'$ is not applied through the vehicle axle (2), as are the axial forces $Y_1$ and $Y_2$, but directly through the wheel rim (19) since each of the two additional axial loading devices (31), which again are preferably servohydraulic cylinder and piston units, is connected to its wheel rim (19) through a linkage (32) and a roller (33) which is in rolling contact with the rim (19) and can be pressed against the rim (19) by the radial loading device (31). The linkage (32) comprises a by-pass device, for example a fork (34), for mechanically by-passing the supporting and force transmitting rod (17).

The additional axial loading devices (31) constructed as described can only produce forces of compression and not forces of tension, in other words they only produce negative additional axial forces $-Y_1'$ and $-Y_2'$.

The additional axial loading device (31) shown on the left in FIG. 1 is mounted on the support (30) of the base while the additional loading device (31) shown on the right of the Figure is mounted on a support (35) at the opposite end of the base (8).

The first embodiment of the apparatus described above with reference to FIG. 1 for testing wheel sets of rail vehicles under loading conditions similar to those encountered in service is not only simpler in construction and operation than the second embodiment described with reference to FIG. 2; the first embodiment has, and drum bearings (25) surrounding each drum (18), which design has the following particular advantages compared with the second embodiment:

(a) Since the drums are mounted in circumferential drum bearings the drums are open at both axial ends so that, the whole apparatus (9) is simpler and more compact in construction and the wheel set (1) mounted in the apparatus (9) is easily accessible from outside and it is not necessary to provide a shackle or loading support (45) in the drum for rotatably fixing the wheel set (1) in FIG. 2 as in the embodiment of FIG. 2. These design aspects give rise to important functional advantages which are described below:

(b) One of the functional advantages of the embodiment of FIG. 1 is that the radial forces can be directly applied through the wheel set bearings (11), which are preferably the original wheel set bearings although special heavy duty bearings may be used.

(c) Another important functional advantage is that the additional masses to be accelerated in the vertical direction are small since in the given embodiment they consist mainly of a fastening device (12) which has a relatively small mass, one or more joints (15) and/or (16) and the supporting and force transmitting rod (17) at each axial end of the wheel set (1) of the rail vehicle. Since these additional masses are small, the test on the wheel sets of the rail vehicle can be adapted more accurately to the conditions occurring in service than is possible with the embodiment of FIG. 2. The simulation at higher frequencies will be better than with the embodiment of FIG. 2.

(d) The axial as well as superimposed additional axial forces may advantageously also be directly introduced into the wheel set (1) of the rail vehicle, as described with reference to FIG. 1. The small additional masses again provide for an advantageous simulation at higher frequencies for the axial and additional axial forces as in the case of the radial forces.

One difficulty of the apparatus according to FIG. 1 is that, at least in the embodiment illustrated, no positive additional axial forces, i.e. no forces of tension can be applied to the wheel rims (19). However, another additional axial loading device (not shown) may be provided on each side between the two drums (18), for example on the fastening device (7), so that a force of compression corresponding to tension acting from outside can be exerted on the inside of the rim (19) of each of the two vehicle wheels (3). This force may be produced, for example, by means of a linkage on each side and a roller contacting the inside of each of the two rims (19) in the manner that force is transmitted from outside by means of the linkage (32) and the roller (33).

The second embodiment of the apparatus for testing wheel sets of rail vehicles under loading conditions similar to those encountered in service will now be described with reference to FIG. 2.

This apparatus, indicated generally by the reference (36), which may be used for testing a wheel set (1) of a rail vehicle as already explained above with reference to FIG. 1, differs from apparatus (9) mainly by the different bearing in which the drums (37) are mounted, which results in a different formation of drums, which in turn necessitates a different formation and arrangement of the support (38) for the wheel set (1) and a different mode of introducing the radial and axial forces and the additional axial forces into the wheel contact points of the two wheels (3).

In the apparatus (36), the two drums (37) are mounted by their drive shafts (39) by which they are rotated. These drive shafts (39) are necessarily provided on the remote axial end faces of the two drums (37), with the result that the interior of the drums (37) is accessible only from the two adjacent axial end faces of the drums.

The rotary drive shafts (39) have bearings by which they are mounted on bearing blocks (41) which are displaceable on the base (42) of the apparatus (36) in the axial direction of the drums (37) so that the drums (37) can be displaced in the axial direction for the installation and removal of the wheel set (1) into and from the apparatus (36) and for the introduction of additional axial forces.

In the present example, each of the two bearing blocks (41) carries an electric motor (43) which rotates the corresponding drum (37) by drive belts (44).

Each of the two wheels (3) of the wheel set (1) of the rail vehicle is supported in a separate loading support (45) near the end of the wheel axle. It should be noted, however, that the two loading supports (45) could be connected together rigidly or elastically. In the present embodiment, each of the two loading supports (45) consists substantially of a loading support (45), which may, for example, be L-shaped as shown in FIG. 2 and which has a wheel set bearing (46) for rotatably mounting the respective end of the vehicle axle (2).

Apparatus (36) of FIG. 2 substantially comprises the same loading devices as the apparatus (9) of FIG. 1 for simulating the various loading conditions which will be described in more detail below, but these loading devices are differently arranged and differently coupled to the wheel set (1) of the vehicle, namely as follows:

(1) Each of the two radial loading devices (14) is connected to its loading support (45) through a supporting and force transmitting device (47) which not only transmits the radial forces which are to be introduced into the wheel set but also movably holds the loading support (45) in the axial and the radial direction.

(2) The axial loading device (28) is coupled to one of the two supporting and force transmitting devices (47), in the present case the supporting and force transmitting device situated on the left in FIG. 2.

(3) Each of the additional axial loading devices (31) is connected to the free end of one of the two rotary drive shafts (39) by a compression and tension thrust bearing (48) so that the additional axial forces $\pm Y_1'$ and $\pm Y_2'$ are applied to the rail contact point of the respective wheel (3) through the drum (37) and the rail (21) situated therein. These two additional axial loading devices (31) are mounted on vertical support structure (49) which are attached to or form an integral part of the base (42).

Two embodiments of the supporting and force transmitting device (47) which basically has the form of a frame will now be described with reference to FIGS. 3, 4 and 5:

The embodiment shown in FIGS. 3 and 4 is substantially similar to the embodiment illustrated more schematically in FIG. 2 but differs from it in that the axial loading device (28) is a double action device situated between the two supporting and force transmitting devices (47). Each of the two supporting and force transmitting devices (47) comprises a frame (50) which is coupled at (51) to the corresponding loading support (45), at (52) to the corresponding radial loading device (14) and at (53) to the axial loading device (28). In the embodiment shown in FIGS. 3 and 4, this frame is mounted parallel to the axle (2) by means of horizontal supports (54) and perpendicularly to the axle (2) by means of vertical supports (55) and is also mounted to be displaceable in relation to the rotary drive shaft (39).

The supporting and force transmitting device (47) of FIG. 5 differs from that of FIGS. 3 and 4 mainly in that the direction of action of the radial loading device (14) is in this case not vertical but horizontal and the frame (50) is therefore displaceable parallel to and at rightangles to the axle (2) and the rotary drive shaft (39) by means of two horizontal guides (56) and (57) placed at rightangles. This particular arrangement of the radial loading device (14) enables the frame (50) to be constructed more simply, i.e. substantially L-shaped instead of U-shaped or double U-shaped since in this embodiment of FIG. 5 the frame need not by-pass the whole wheel set (1) laterally.

The radial loading devices (14) and the axial loading devices (28) are mounted on the base (42) and/or on one or more supports connected to the base (42).

An emergency brake (58) is mounted on each of the two rotary drive shafts (39). Suction devices (59) are provided under the two brake discs (5) to remove abrasion dust from the brakes.

The whole structure mounted on the base (42) has a cover (60) comprising, as shown in FIG. 2, several telescopically displaceable sections.

The simulation of the various loadings by means of the apparatus described above will now be explained with reference to FIGS. 6 to 9 which show schematically the important applications of load to the wheel set of a rail vehicle. The signs have the same meanings as above; forces of reaction marked with an asterisk are positive when they are directed towards the centre of the vehicle and negative when they are directed to the outside of the vehicle, and forces of action not marked with an asterisk are positive when they are forces of tension exerted at the point of action of the loading device and negative when they are forces of compression exerted on the point of action of the loading device.

It should also be noted that the testing of wheel sets of rail vehicles with the apparatus described above may comprise in particular testing of the wheels themselves, of the wheel axle or wheel set shaft, of the connection between the wheel and the axle or wheel set shaft, of the wheel set bearings, the brake components, and other parts on the wheel sets.

The simulation of various modes of loading will now be described:

I. The simulation of the loading condition when the vehicle travels through a curve or round a bend will first be described. Under real conditions, travelling round a bend is mainly characterised in that the centrifugal forces produce a quasistatic shifting of the weight to the wheel on the outside of the curve. The greatest radial force $Q_1^*$ and the greatest axial force $Y_1^*$ directed towards the centre of the vehicle therefore act on the wheel situated on the outside of the curve while the wheel on the inside of the curve is subjected to a lower radial force $Q_2^*$ and a lower axial force $Y_2^*$ since this wheel is to some extent relieved of its load. This lower axial force $Y_2^*$ is also directed towards the centre of the vehicle since the wheels are set at an angle to the rail when they travel in a curve due to the rigid wheel axle. The load conditions when the vehicle moves over a curve is therefore characterised by $Y_1^* > Y_2^*$ and $Q_1^* > Q_2^*$ as shown in FIG. 6.

Stimulation of the loading conditions when travelling through a curve is carried out as follows both with the apparatus of FIG. 1 and with the apparatus of FIG. 2:
  (1) The forces of reaction $Q_1^*$ and $Q_2^*$ are produced by the forces of action $Q_1$ and $Q_2$.
  (2) The force of reaction $Y_1^*$ is simulated by the application of a tension load by means of the axial loading device (28) which produces a force of action $-Y_1$.
  (3) The force of reaction $Y_2^*$ is simulated by a force of compression produced by the additional axial loading device (31) shown on the right in FIGS. 1 and 2, in other words by exerting a positive additional axial force $Y_2'$.

II. The loads acting under sinusoidal travelling conditions, typical for rail vehicles by travelling forwards in a straight line, are characterised in that alternating dynamic radial forces $Q_1^*$ and $Q_2^*$ are produced by impacts and superimposed on the static radial force, as explained above with reference to FIG. 1. In addition, alternating axial forces are produced on both vehicle wheels due to the to and fro rocking of the vehicle when it is travelling straight forwards. These forces are alternating forces of reaction $\pm Y_1^*$ on one wheel and alternating forces of reaction $\pm Y_2^*$ on the other wheel of a wheel-set.

The loads acting under these conditions are simulated in the same manner in both apparatus of FIGS. 1 and 2, namely the forces of action produced in the apparatus are alternating axial forces $\pm Y_1$ and $\pm Y_2$ and alternating radial forces $Q_1$ and $Q_2$ and neither additional axial forces $\pm Y_1'$ nor additional axial forces $\pm Y_2'$ are applied.

III. The loads acting on a vehicle moving over points are characterized in that large radial forces $Q_1^*$ and $Q_2^*$ act unilaterally as forces of reaction, i.e. on one of the two wheels situated on the same axle, and large axial forces $\pm Y_1^*$ and $\pm Y_2^*$ act unilaterally in both directions, as indicated for the left vehicle wheel in FIG. 8.
  (A) The loads acting when the vehicle moves over points are simulated as follows in the apparatus of FIG. 1:
    (1) The large positive forces of reaction $Y_1^*$ and $Y_2^*$ are simulated by large positive forces of action $Y_1$ and $Y_2$ and no additional axial forces $Y_1'$ and $Y_2'$ are exerted.

In the apparatus shown in FIG. 1, simulation of large negative reaction forces $-Y_1^*$ and $-Y_2^*$ is not possible.
    (2) The forces of reaction $Q_1^*$ and $Q_2^*$ are simulated by alternately applying large forces of action $Q_1$ and $Q_2$ unilaterally.
  (B) The loads acting on a vehicle moving over points are simulated by the apparatus of FIG. 2 as follows:
    (1) The forces of action applied are large alternating axial forces $\pm Y_1$ and $\pm Y_2$ in combination with alternating additional axial forces $\pm Y_1'$ and $\pm Y_2'$ but when large negative axial forces $-Y_1$ are applied then $Y_1'$ is zero and when large positive additional axial forces $+Y_1'$ are applied then $Y_1$ is zero, and the same applies to the forces of action $Y_2$ and $Y_2'$.
    (2) In addition, large unidirectional forces of action $Q_1$ and $Q_2$ are produced alternately.

FIG. 8 illustrates the characteristic case of a vehicle moving over points. This is characterized in that in one of the two vehicle wheels, a large radial force $Q_1^*$ occurs in combination with a negative axial force $-Y_1^*$.

IV. The loads acting when the brake is applied are characterized in that large radial forces $Q_1^*$ and $Q_2^*$ occur as forces of reaction and the braking forces $B_1^*$ and $B_2^*$ occur in the longitudinal direction of the vehicle.

Simulation of the loads produced by braking is carried out in the same manner in both apparatus of FIGS. 1 and 2. The brake device (4) is used for this purpose. This may be the original brake device of the rail vehicle and when the brake device is put into operation, braking forces $B_1$ and $B_2$ acting on both wheel contact points in the longitudinal direction of the vehicle are produced as forces of action. Radial forces $Q_1$ and $Q_2$ are also produced as forces of action by means of the radial loading devices (14).

It should be noted in conclusion that grooved rings mentioned above should be used for introducing axial forces directed to the centre of the vehicle. These rings may be made in one part or composed of two parts, as shown in FIGS. 1 and 2.

The apparatus shown in FIGS. 1 and 2 may advantageously be constructed as high velocity test stands by using suitable circumferential drum bearings (25) in the apparatus of FIG. 1 and relatively small ball bearings (40) on the rotary drive shaft (39) in the apparatus of FIG. 2 so that velocities of 350 to 400 km/h can be simulated whereas the apparatus shown in German patent specification No. 2 601 259 can only simulate velocities of 50 to 80 km/h because this apparatus has relatively large ball bearings on the circumference of the drum.

The apparatus according to the invention, in particular in its embodiments illustrated and described here, is distinguished from the apparatus according to German Pat. No. 2 601 259 in that it provides true fatigue life tests for individual components of a complete wheel set of a rail vehicle, comprising the vehicle wheels, the wheel axle, means by which the brakes are attached, etc. and at the same time the wheel sets to be tested can be installed and removed relatively easily.

The apparatus according to the invention may be controlled by means of a computer, in particular a microcomputer which can control the individual loads, their combinations and the corresponding velocities according to a program. By using the correct program to control the apparatus for the desired use of the wheel set of the rail vehicle and by frequent repetition of simulated service conditions, the necessary proof of operational reliability of the wheel-sets can be provided within a greatly reduced period of test time.

We claim:

1. Method of testing the wheels or complete wheel sets of rail vehicles, in which a whole wheel-set of a rail vehicle, comprising at least one axle and at least two vehicle wheels attached to its ends is tested by the introduction of radial and axial forces into the contact point of the wheel to the rail, said method comprising:
    (a) the radial forces are introduced selectively upon the region of the wheel axis of one of the two wheels of the rail vehicle or both wheels;
    (b) the test is carried out under loading conditions similar to those prevailing in service;
    (c) the complete wheel-set of the rail vehicle is rotated by bringing the vehicle wheels into rolling contact with rotating rings which represent the rail and are mounted inside of drums;
    (d) the axial forces are introduced through the wheel axle region of one of the two vehicle wheels or of both wheel axle regions;
    (e) the axis of the wheel set is maintained parallel to the axis of the drums;
    (f) axial outward forces are introduced selectively by side rings which are mounted inside the drums spaced axially inwardly from the rotating rings representing the rails and which side rings are designed such that the wheels can be brought into contact therewith.

2. Method according to claim 1, characterized in that in addition to the axial forces introduced through the axle, additional axial forces are introduced into the wheel contact points of one or both vehicle wheels by way of the wheel rim or the ring representing the rail, on which the particular wheel is run during the test.

3. Method according to claim 2, characterized in that for testing the wheel-set of the rail vehicle under conditions of traveling through a curve or a round bend, an axial force is introduced into the wheel contact point of one wheel through the wheel axle region of this wheel and at the same time an additional axial force is introduced into the wheel contact point of the other wheel through the wheel rim or through the ring representing the rail, on which this other wheel is run.

4. Method according to claim 2, characterized in that for testing the wheel-set of the rail vehicle under conditions of moving over points, an axial force is introduced into the wheel contact point of one wheel through the region of its wheel axle while no additional axial force is introduced into this contact point either through the wheel rim or through the ring representing the rail and in that, alternating with this introduction of axial force, no axial force is introduced into the wheel contact point of the wheel through the wheel axle region while an additional axial force is introduced into this wheel contact point through the ring representing the rail or through the wheel rim.

5. Method according to claim 1 or 2, characterized in that in addition to testing the wheels and the axle, the brake of the wheel-set of the rail vehicle is also tested by actuating the original brakes and due to it by introduction of the reaction to braking forces at the wheel contact point.

6. Apparatus for testing the wheels of rail vehicles, in which a whole wheel-set of a rail vehicle, comprising at least one axle and at least the vehicle wheels mounted on the ends of the axle is being tested by the introduction of radial and/or axial forces into the wheel contact point through a ring which represents the rail, the radial forces being introduced selectively upon the wheel axle region of one of the two wheels or both wheels, comprising:
    (a) a support for rotatably securing the wheel set of the vehicle;
    (b) a first radial loading device connected with the wheel axle region of one vehicle wheel and a second radial loading device connected with the wheel axle region of the other vehicle wheel,
    (c) an axial loading device for applying an axial force,
    (d) a drum placed around each vehicle wheel in such a manner that the wheel can be brought into rolling contact with the ring representing the rail, positioned on the internal circumferential surface of the drum,
    (f) the axial loading device is connected to the axle of the wheel set of the rail vehicle either directly or through a loading support in which the wheel set of the vehicle is held,
    (g) the axis of the wheel set is maintained parallel to the axis of the drums; and
    (h) side rings are mounted inside the drums spaced axially inwardly from the rotating rings representing the rails and which side rings are designed such that the wheels can be brought into contact therewith to introduce selectively axial outward forces into the wheel.

7. Apparatus according to claim 6, characterized in that at least one additional axial loading device is provided for the introduction of an additional axial force into the wheel contact point of at least one of the two vehicle wheels, which device is coupled to the wheel rim or to the ring which represents the rail of at least one of the vehicle wheels for application of the additional axial force.

8. Apparatus according to claim 7, characterized in that a separate additional axial loading device is provided for each of the two vehicle wheels.

9. Apparatus according to claim 7, characterized in that the additional axial loading device is directly coupled to the rim of the vehicle wheel, preferably through one or more rollers.

10. Apparatus according to claim 7, characterized in that the additional axial loading device is coupled to the drum, preferably through a tension-compression thrust bearing.

11. Apparatus according to claim 6 or 7, characterized in that the axial loading device is directly coupled to the axle, preferably through a thrust bearing.

12. Apparatus according to claim 6 or 7, characterized in that the rails used for the introduction of axial forces in the outward direction are provided with predetermined shaped rings having grooves and a side ring.

13. Apparatus according to claim 6 or 7, characterized in that a separate drum is provided for each of the two vehicle wheels.

14. Apparatus according to claim 6 or 7, characterized in that the rotating drums provided for both wheels of the rail vehicle or a drum provided for a single wheel is mounted in a drum bearing arranged round its circumference comprising a hydrostatic or electromagnetic bearing, and the drum is substantially open in the axial direction.

15. Apparatus according to claim 6 or 7, characterized in that the two rotating drums are open on the sides facing each other in the axial direction, the drums being provided for respective wheels of the rail vehicle, said drums being mounted on drive shaft.

16. Apparatus according to claim 15, characterized in that the rotating drums or the individual drum are displaceable in the axial direction.

17. Apparatus according to claim 15 or 16, characterized in that, when two separate drums are used, each wheel of the rail vehicle is supported by a separate loading support through the corresponding end of the axle, which loading support is connected with a supporting and force transmitting device which is displaceable perpendicularly to and parallel to the axle and which is coupled to the axial and radial loading devices.

* * * * *